UNITED STATES PATENT OFFICE.

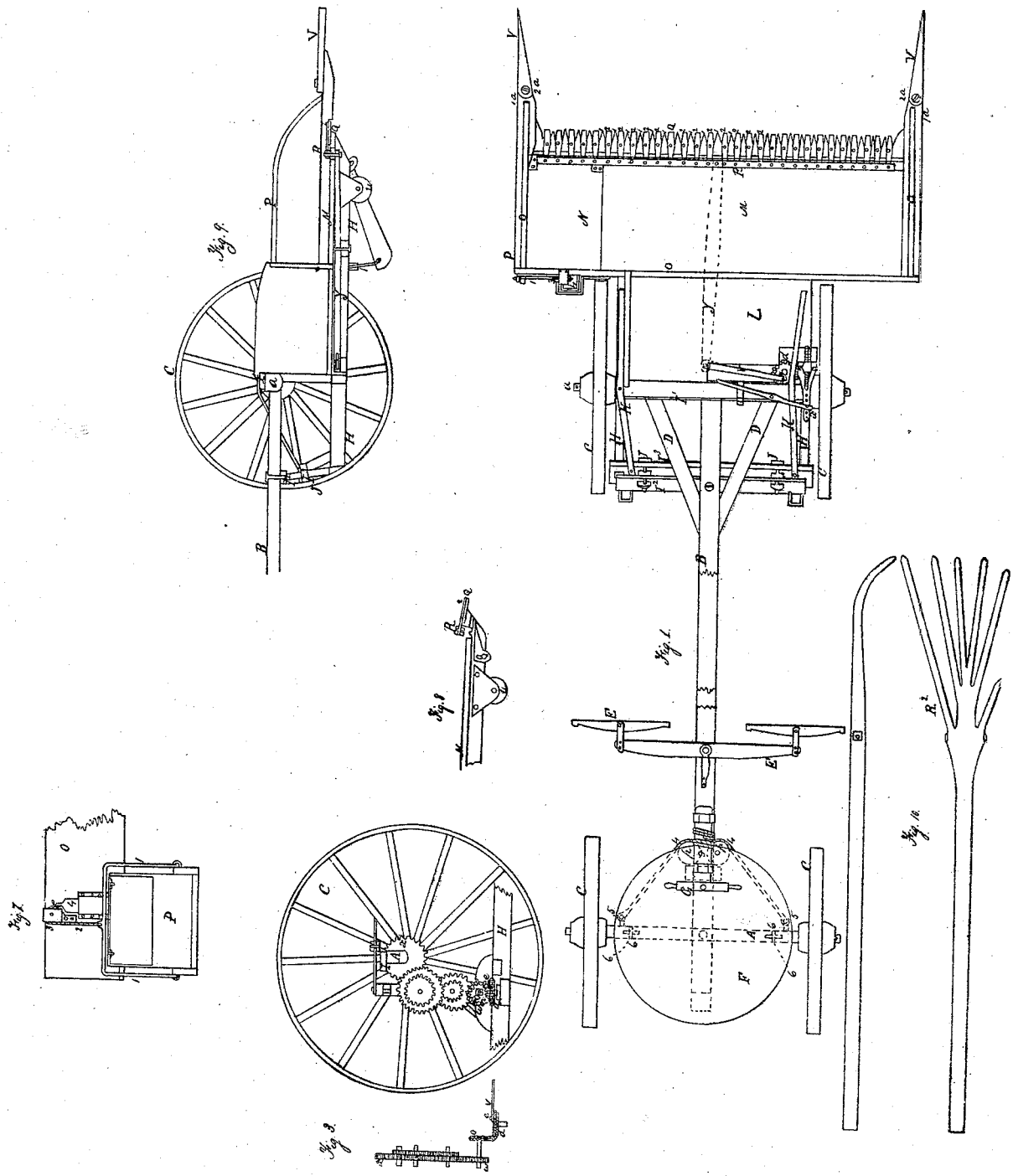

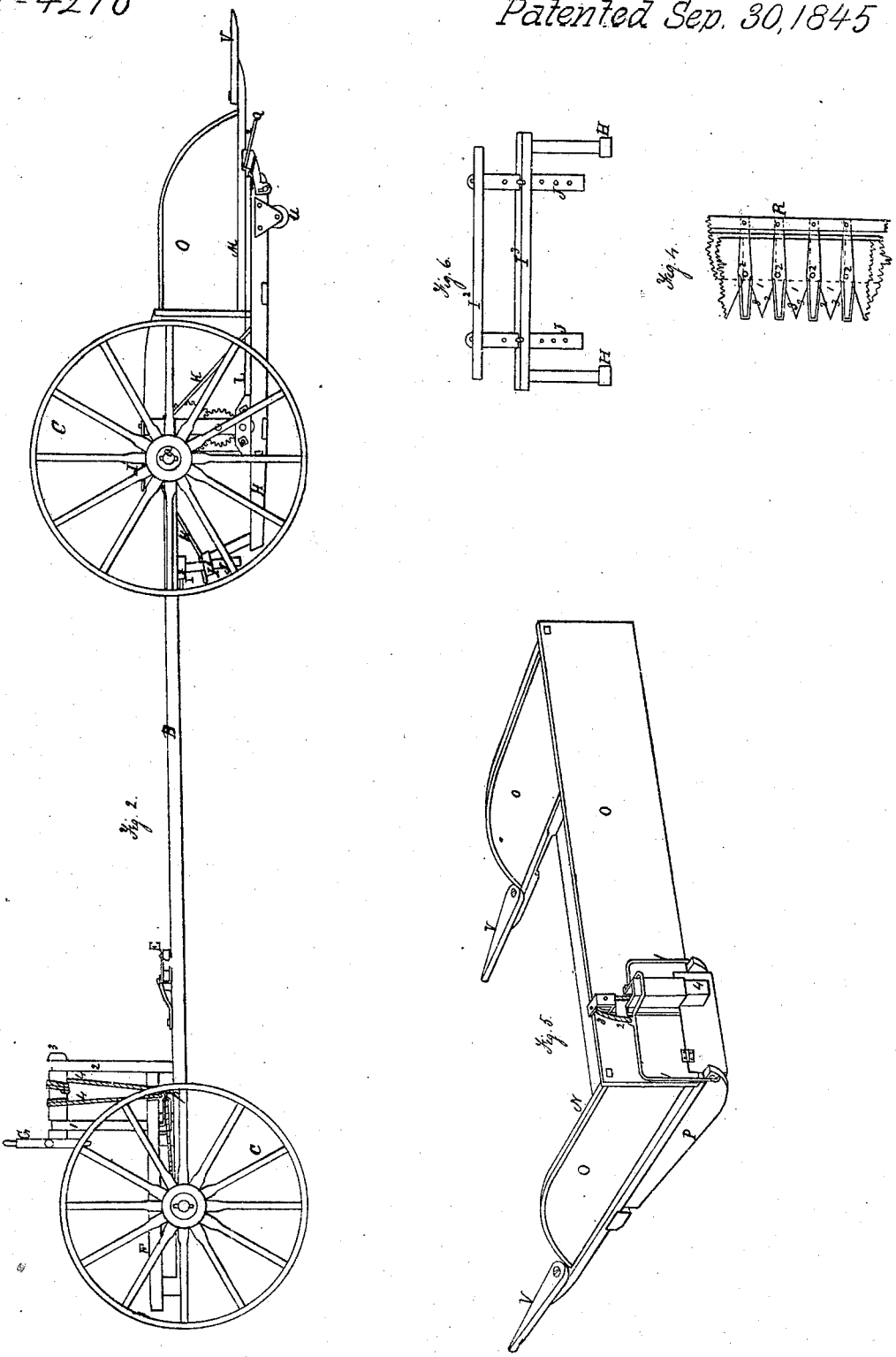

FERDINAND WOODWARD, OF UPPER FREEHOLD TOWNSHIP, MONMOUTH COUNTY, NEW JERSEY.

IMPROVEMENT IN REAPING-MACHINES.

Specification forming part of Letters Patent No. 4,216, dated September 30, 1845.

*To all whom it may concern:*

Be it known that I, FERDINAND WOODWARD, of Cream Ridge, in the township of Upper Freehold, county of Monmouth, and State of New Jersey, have invented a new and useful Machine for Cutting Grain, Grass, &c.; and I do hereby declare that the following is a full, clear, and exact description of the construction and operation of the same, reference being had to the annexed drawings of the same, making a part of this specification, in which—

Figure 1 represents a bird's-eye view of the machine; Fig. 2, a side view; Fig. 3, front and side view of the gearing; Fig. 4, a section of the steel blades or cutters; Fig. 5, a perspective view of the sheaf-box and the platform on which the grain falls. Fig. 6 represents a part of the frame-work or timber directly under or crosswise of the perch and the crutch D, also the uprights J J; Fig. 7, rear end of the sheaf-box; Fig. 8, section showing the apparatus for adjusting the position of the cutters; Fig. 9, section of the sheaf-box; Fig. 10, the rake.

A $a$ represent the rear and front axles; B, the perch; C C C C, four ordinary or light carriage-wheels. On the axles A $a$, on which the machine moves, the right-hand front wheel has a cog-wheel, $x$, Figs. 1 and 3, of proper size, attached to it on the inner or left side, for giving motion to other cog-wheels and to the machinery and cutters.

D D represent a crutch or braces; E E, single-trees, to which the team is to be attached; F, a platform on which a person stands at the windlass G or guiding-wheel to guide the machine. The platform F is supported by a bolt passing through its center and the center of the hinder axle, and the perch, also resting on small wheels or rollers 6, let in the axle near the circumference of the platform F.

G is a guiding-wheel or windlass; 4, tiller ropes or bands coiled around the windlass, then passing down and around friction-pulleys $p$, near the perch and front edge of the platform and under the platform F, to hooks 5 5, placed through the hind axle-tree, A, near the hub or shoulder of the axle; H H, the two side timbers of the frame-work, which pass horizontally below the front axle, $a$, near the wheels C C, from a convenient distance in the rear of the front axle to the front part of the machine, supporting the platform L, on which the raker stands, the platform M, on which the grain or grass falls from the cutters, and the grain or sheaf box N, also the cross-bar or timber on which the cutters or shear-blades are fastened; $I'$ $I^2$ $I^3$, timbers fastened crosswise of the machine. $I'$ is placed directly over and extending over the front of the axle $a$; $I^2$, directly across and under the perch B and crutch D, and is bolted or fastened to them; $I^3$, directly under $I^2$ and connected to it by two upright swords, J J, Fig. 6, which are passed through mortises in bar $I^3$ and made fast by pins at the required height. Said swords also pass through mortises in bar $I^2$, which is permitted to pass up and down for the purpose of elevating or depressing the cutters, and is secured by pins placed through holes in the swords J J, secured or moved at pleasure, as represented in Fig. 6. The cutters or blades Q, Figs. 1 and 4, may be raised still higher by placing blocks under $I'$ and on axle $a$.

O O O O are sides and back of the platform, to prevent the grain from falling off the platform, composed simply of thin boards nailed to corner and other upright strips fastened in mortises in the platform; or there may be a bow bent over the sides and passed through a hole in the back, and likewise through the bottom strip, on which the hand to separate the standing grain is placed.

P is the side of the box into which the grain is thrown. (See Figs. 1, 5, and 9.) The box may be made of pine or other light boards, consisting of three pieces—a bottom and two sides—of sufficient dimensions to contain a large sheaf of grain, which box is to be fastened by means of hinges attached to the end of the bottom of the box and to the bar or timber on which the cutters Q are fixed, and is supported in the rear by a bent iron rod, 1, in Fig. 5, and cord 2, passing over pulley 3, with weight 4 attached, which is of sufficient gravity to support the rear end of the box when empty, or nearly so, but not when the sheaf is in. In case the stubble should be very stiff, it will be found necessary to attach a temporary board to the bar at the front end of the box by hinges, and to pass back immediately under the box to be pressed down by means of a spring or weight, which will allow the box to play freely. This box may be two feet or more in width and from one to two inches in depth at the front end and from three to eight inches at the back, and may be composed of boards, tin, zinc, or sheet-iron, or any suitable material.

Q, Fig. 4, represents the cutters, blades, or shears, made from cast-steel plates of one-eighth of an inch or less in thickness, the shape represented in the Drawings 1 and 2, Fig. 4. The blades are ground to an edge and tempered on the cutting part, the upper blade, 2, Fig. 4, being about seven inches long and one and a quarter inch wide in the middle and five-eighths of an inch at the end, with screw-holes, as represented in the drawings, the lower blade about five and a half inches long, with three inches edge, as seen in Fig. 4, with a notch, 4, cut out of one side, of about three-fourths of an inch. These may be made two and a half or three inches wide on the square part and one inch or wider at the front or cutting edge, provided they taper out to a point. The upper blade is fastened to the lower by a rivet or a screw passing through both and into the timber which the blades are fastened.

R is the connecting-rod, Fig. 1, to which the rear ends of all the upper blades or cutters are fastened, either by screws, rivets, bolts, or pins, or other suitable means, and by which they are worked and put in motion.

U, Figs. 2 and 9, are wheels or runners, which run in metal or wooden clips fastened near the ends of the sills H H for the purpose of raising the blades or cutters Q in case of irregularity in the ground, which wheels, when they strike the ground, will cause the frame to rise by raising the bars $I^3$, Figs. 1, 3, and 6, or by raising the bar $I'$, Fig. 1, from the axle $a$.

V represents hands or separators to guide the grain to the blades or cutters Q and separate it from that which is to be left standing. They are to be fastened to the side strips by screw-bolts or otherwise, Figs. 1, 2, and 9, and will allow being turned outward, so as to make the machine cut from one to two feet wider than the knives or range of blades Q. In case the grain should stand thin the hands may be made of different lengths, as occasion may require. The strips $1^d$ may be made of any good inch-board, about three inches wide, and made fast to the end elevations of platform M.

The gearing consists of a cog-wheel, $x$, on the right fore wheel, $c$, of about sixteen inches diameter, which gives motion to a train of cog-wheels of various diameters. (Represented in the drawings, Figs. 1 and 3.) On the out end of the shaft of the lower pinion, $w$, is a small vertical bevel-wheel, $o$, which gears into a horizontal bevel-wheel of the same diameter as the other, and in which is a pin, $c$, about one inch from the center, or of sufficient distance to give the blade sufficient sweep. Upon this pin the pitman is placed secure, and fastened at its other end to the lever $y$ under the platform M, which is denoted by the dotted lines. The lever $y$ is fastened securely to one of the cross-bars, under the platform, by a bolt or pivot, and the forward end by a joint or hinge to the connecting-rod immediately under the center of the rear ends of the upper range of cutters or blades. These cog-wheels are geared sufficiently sharp to cause the blades to clip once in going forward the length of their cutting part.

J J, Fig. 2, are four uprights connecting the sills H H with the bars $I^2$ and $I^3$; K K, light bars or straps of metal passing over the cross-bar $I'$, Fig. 1, near its end, and secured in front to the sills H H and in the rear to the cross-bar $I^3$.

The raker stands upon the platform L, and, as the grain is cut and falls upon the platform M, he, with the fork or rake $R^2$, conveys it to the hinged box N, called the "sheaf-box," and when a quantity is accumulated therein sufficient to overcome in weight the friction of the cord and pulley and weight 4, by which the rear end of the box is held up, the rear end of the box will drop until it strikes the ground, causing the bottom to assume an angle of about forty or forty-five degrees, when the straw will slide or roll down over it to the ground in the form of a gavel. The weight then descends and the bottom rises to its former position. Should the grain hang in the box, a slight touch with the rake will start it therefrom.

What I claim as my invention, and desire to secure by Letters Patent, is—

The combination of a sheaf-box with the platform, into which the grain is thrown before being deposited upon the ground from the platform.

FERDINAND WOODWARD.

Witnesses:
JAMES S. LAURENCE,
PHEBE ANN LAURENCE.